US011435630B2

(12) United States Patent
Wang

(10) Patent No.: US 11,435,630 B2
(45) Date of Patent: Sep. 6, 2022

(54) LIQUID CRYSTAL DISPLAY PANEL AND MANUFACTURING METHOD THEREOF, AND FRAMELESS LIQUID CRYSTAL DISPLAY DEVICE

(71) Applicant: TCL China Star Optoelectronics Technology Co., Ltd., Shenzhen (CN)

(72) Inventor: Zui Wang, Shenzhen (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 269 days.

(21) Appl. No.: 16/627,814

(22) PCT Filed: Sep. 20, 2019

(86) PCT No.: PCT/CN2019/107095
§ 371 (c)(1),
(2) Date: Dec. 31, 2019

(87) PCT Pub. No.: WO2021/035847
PCT Pub. Date: Mar. 4, 2021

(65) Prior Publication Data
US 2021/0356820 A1    Nov. 18, 2021

(30) Foreign Application Priority Data

Aug. 27, 2019   (CN) .......................... 201910797293.3

(51) Int. Cl.
*G02F 1/1362* (2006.01)
*G02F 1/1333* (2006.01)

(52) U.S. Cl.
CPC .. *G02F 1/136209* (2013.01); *G02F 1/133351* (2013.01)

(58) Field of Classification Search
None
See application file for complete search history.

(56) References Cited

U.S. PATENT DOCUMENTS

2014/0176853 A1* 6/2014 Wang ................ G02F 1/133512
349/58
2017/0139263 A1* 5/2017 Jin ........................ G02F 1/1368

FOREIGN PATENT DOCUMENTS

CN    104503133 A1 *  4/2015  ....... G02F 1/133512

* cited by examiner

*Primary Examiner* — Richard H Kim

(57) ABSTRACT

A liquid crystal display panel and a manufacturing method thereof, and a frameless liquid crystal display device are provided. The liquid crystal display panel includes an array substrate, a counter substrate, and a liquid crystal layer. The array substrate includes a first region and a second region. The counter substrate includes a third region and a fourth region. A black matrix covers one side of the fourth region, and a metal light-shielding portion is disposed on one side of the array substrate facing toward the counter substrate. The metal light-shielding portion covers the second region and a part of the first region adjacent to the second region, and a side-edge of the metal light-shielding portion near the first region is located below the black matrix. Through adding the metal light-shielding portion, light leakage occurring on edges of a frameless liquid crystal display device is solved, and display quality is improved.

5 Claims, 6 Drawing Sheets providing a liquid crystal display motherboard, the liquid crystal display motherboard comprising a plurality of liquid crystal display panels arranged apart from each other; each of the plurality of liquid crystal display panels comprises an array substrate, a counter substrate facing the array substrate, and a liquid crystal layer located between the array substrate and the counter substrate; the array substrate comprises a first region covered by the counter substrate, and a second region located outside the first region; the counter substrate comprises a third region and a fourth region surrounding the third region; and a black matrix covers one side of the fourth region facing toward the array substrate, and a metal light-shielding portion is disposed on one side of the array substrate facing toward the counter substrate — S1 defining a first cutting line along a side-edge of the second region away from the first region, and defining a second cutting line along a side-edge of the fourth region away from the third region, wherein a side-edge of the metal light-shielding portion away from the first region exceeds the first cutting line — S2 cutting the liquid crystal display motherboard along the first cutting line and along the second cutting line for the plurality of liquid crystal display panels — S3

FIG. 5

LIQUID CRYSTAL DISPLAY PANEL AND MANUFACTURING METHOD THEREOF, AND FRAMELESS LIQUID CRYSTAL DISPLAY DEVICE

RELATED APPLICATIONS

This application is a National Phase of PCT Patent Application No. PCT/CN2019/107095 having International filing date of Sep. 20, 2019, which claims the benefit of priority of Chinese Patent Application No. 201910797293.3 filed on Aug. 27, 2019. The contents of the above applications are all incorporated by reference as if fully set forth herein in their entirety.

FIELD AND BACKGROUND OF THE INVENTION

The present disclosure relates to the field of display technology, and more particularly, to a frameless liquid crystal display panel and a manufacturing method thereof.

With the development of display technology, liquid crystal display (LCD) devices consisting of liquid crystal display panels and other flat-panel display devices possess advantages of high image quality, power saving, thin body, and no radiation. Thus, they have been widely applied in various consumer electronic products, such as cell phone, television, personal digital assistant, digital camera, notebook, desktop computer, etc. and become the mainstream display devices.

Generally, a liquid crystal display panel consists of a color filter (CF) substrate, a thin film transistor (TFT) substrate, liquid crystals (LCs) sandwiched between the color filter substrate and the thin film transistor substrate, and a sealant frame. In general, its formation process includes a front-stage array process (such as thin-film, photolithography, etching, stripping), a middle-stage cell process (i.e., sticking the TFT substrate to the CF substrate), and a back-stage module-assembling process (i.e., bonding a driving integrated circuit to a printed circuit board). In the front-stage array process, the TFT substrate is mainly formed in order to control the motion of the liquid crystal molecules. In the middle-stage cell process, liquid crystals are mainly added between the TFT substrate and the CF substrate. The back-stage module-assembling process is mainly to bond the driving integrated circuit to the printed circuit board and is further to drive the rotation of the liquid crystal molecules to display images.

Currently, the liquid crystal display devices have outer bezels with a constant width to cover the surrounding surfaces of the liquid crystal display panels, leading to visual feelings that a display area of the display devices is reduced. In order to increase the display area of the display devices with the same sizes, liquid crystal display devices with a bezel less design will become an important development trend of the present display technology. Compared with conventional structures, a front-frame on a non-bonding side is removed from a whole module of a frameless liquid crystal display panel, so that the liquid crystal display panel is directly exposed outside. Thus, a visual effect of fully integration is realized.

Because of no shielding of the front-frame, light emitted from a backlit module is projected outside the edges of the liquid crystal display panel through reflection and refraction for many times, leading to light leakage occurring on the edges. Also, in order to prevent film layers from peeling, conventional liquid crystal display panels generally use CF substrates located inside, relative to TFT substrates. Such design further deteriorates the light leakage occurring on the edges.

SUMMARY OF THE INVENTION

The object of the present disclosure is to provide a liquid crystal display panel, which can solve the problem of light leakage occurring on edges of a frameless liquid crystal display device and improve display quality.

The object of the present disclosure is further to provide a method of manufacturing a liquid crystal display panel, which can solve the problem of light leakage occurring on edges of a frameless liquid crystal display device and improve display quality without increasing manufacturing costs.

The object of the present disclosure is further to provide a frameless liquid crystal display device, which can prevent light leakage occurring on edges and improve display quality.

In order to realize the above objects, the present disclosure provides a liquid crystal display panel, including: an array substrate, a counter substrate facing the array substrate, and a liquid crystal layer located between the array substrate and the counter substrate;

wherein the array substrate includes a first region covered by the counter substrate, and a second region located outside the first region; wherein the counter substrate includes a third region and a fourth region surrounding the third region;

wherein a black matrix covers one side of the fourth region facing toward the array substrate, and a metal light-shielding portion is disposed on one side of the array substrate facing toward the counter substrate; and wherein the metal light-shielding portion covers the second region and a part of the first region adjacent to the second region, and a side-edge of the metal light-shielding portion near the first region is located below the black matrix.

The metal light-shielding portion is in a floating state.

The metal light-shielding portion is connected to a common voltage of the liquid crystal display panel.

The metal light-shielding portion is a continuous plate-shaped metal thin-film or a mesh metal thin-film.

The present disclosure provides a method of manufacturing a liquid crystal display panel, including:

s1) providing a liquid crystal display motherboard, the liquid crystal display motherboard including a plurality of liquid crystal display panels arranged apart from each other;

wherein each of the plurality of liquid crystal display panels includes an array substrate, a counter substrate facing the array substrate, and a liquid crystal layer located between the array substrate and the counter substrate; wherein the array substrate includes a first region covered by the counter substrate, and a second region located outside the first region; wherein the counter substrate includes a third region and a fourth region surrounding the third region; and wherein a black matrix covers one side of the fourth region facing toward the array substrate, and a metal light-shielding portion is disposed on one side of the array substrate facing toward the counter substrate;

s2) defining a first cutting line along a side-edge of the second region away from the first region, and defining a second cutting line along a side-edge of the fourth region away from the third region, wherein a side-edge of the metal light-shielding portion away from the first region exceeds the first cutting line;

s3) cutting the liquid crystal display motherboard along the first cutting line and along the second cutting line for the plurality of liquid crystal display panels; and s4) cutting the liquid crystal display motherboard along preset first cutting lines respectively and along preset second cutting lines respectively for the plurality of liquid crystal display panels, and then removing a part of the metal light-shielding portion exceeding the first cutting line for each of the plurality of liquid crystal display panels, wherein the rest of the metal light-shielding portion covers the second region and a part of the first region adjacent to the second region, and a side-edge of the metal light-shielding portion near the first region is located below the black matrix.

In the step s2), both a distance between the side-edge of the metal light-shielding portion, away from the first region, and the first cutting line and a distance between the side-edge of the metal light-shielding portion, near the first region, and the first cutting line are greater than 100 micrometers.

The metal light-shielding portion is in a floating state.

The metal light-shielding portion is connected to a common voltage of the liquid crystal display panels.

The metal light-shielding portion is a continuous plate-shaped metal thin-film or a mesh metal thin-film.

The present disclosure provides a frameless liquid crystal display device, including the above liquid crystal display panel.

The beneficial effect of the present disclosure is as follows: the present disclosure provides a liquid crystal display panel and a manufacturing method thereof, and a frameless liquid crystal display device. The liquid crystal display panel includes an array substrate, a counter substrate facing the array substrate, and a liquid crystal layer located between the array substrate and the counter substrate; wherein the array substrate includes a first region covered by the counter substrate, and a second region located outside the first region; wherein the counter substrate includes a third region and a fourth region surrounding the third region; wherein a black matrix covers one side of the fourth region facing toward the array substrate, and a metal light-shielding portion is disposed on one side of the array substrate facing toward the counter substrate; and wherein the metal light-shielding portion covers the second region and a part of the first region adjacent to the second region, and a side-edge of the metal light-shielding portion near the first region is located below the black matrix. Through adding the metal light-shielding portion, the present disclosure can solve the problem of light leakage occurring on edges of a frameless liquid crystal display device and improve display quality.

BRIEF DESCRIPTION OF THE SEVERAL VIEWS OF THE DRAWINGS

In order to understand the features and the technical content of the present disclosure further, please refer to the detailed explanation and the accompanying drawings of the present disclosure as follows. However, the accompanying drawings are merely for reference and explanation without limiting the present disclosure.

FIG. 5 is a flowchart of a method of manufacturing a liquid crystal display panel according to the present disclosure.

DESCRIPTION OF SPECIFIC EMBODIMENTS OF THE INVENTION

In order to explain the technical solutions and the effects of the present disclosure further, they will be described in conjunction with preferred embodiments and the accompanying drawings of the present disclosure in detail below.

Figure 1:
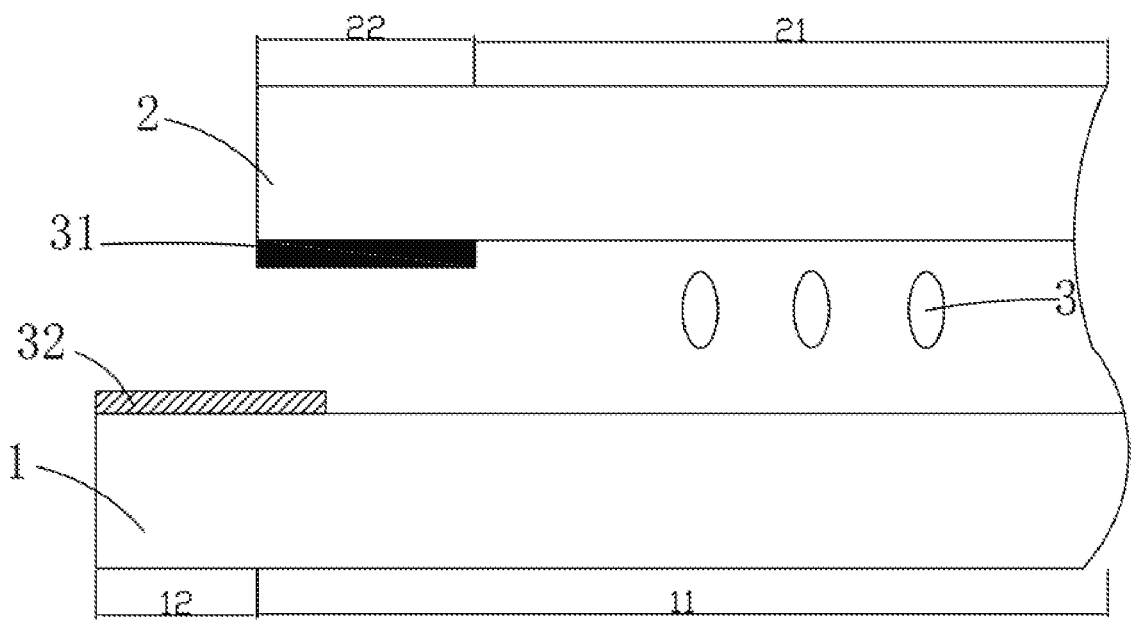
FIG. 1 is a side view of a liquid crystal display panel according to the present disclosure.

Please refer to FIG. 1, the present disclosure provides a liquid crystal display panel, including an array substrate 1, a counter substrate 2 facing the array substrate 1, and a liquid crystal layer 3 located between the array substrate 1 and the counter substrate 2.

The array substrate 1 includes a first region 11 covered by the counter substrate 2, and a second region 12 located outside the first region 11. The counter substrate 2 includes a third region 21 and a fourth region 22 surrounding the third region 21.

A black matrix 31 covers one side of the fourth region 22 facing toward the array substrate 1, and a metal light-shielding portion 32 is disposed on one side of the array substrate 1 facing toward the counter substrate 2.

The metal light-shielding portion 32 covers the second region 12 and a part of the first region 11 adjacent to the second region 12, and a side-edge of the metal light-shielding portion 32 near the first region 11 is located below the black matrix 31.

Specifically, an electric connection state of the metal light-shielding portion 32 can be determined according to practical requirements of product. In some embodiments of the present disclosure, the metal light-shielding portion 32 can be in a floating state without connecting with any voltage. In other embodiments of the present disclosure, the metal light-shielding portion 32 is connected to a common voltage VCom of the liquid crystal display panel.

Figure 3:
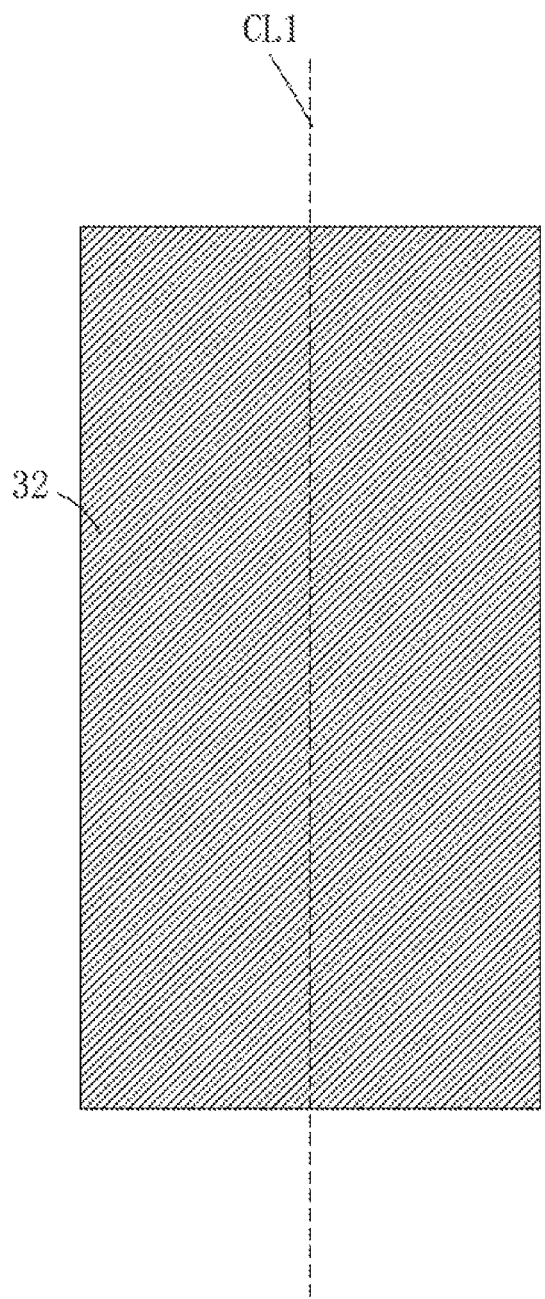
FIG. 3 is a schematic position diagram of a metal light-shielding portion and a first cutting line in a method of manufacturing a liquid crystal display panel according to an embodiment of the present disclosure.
Figure 4:
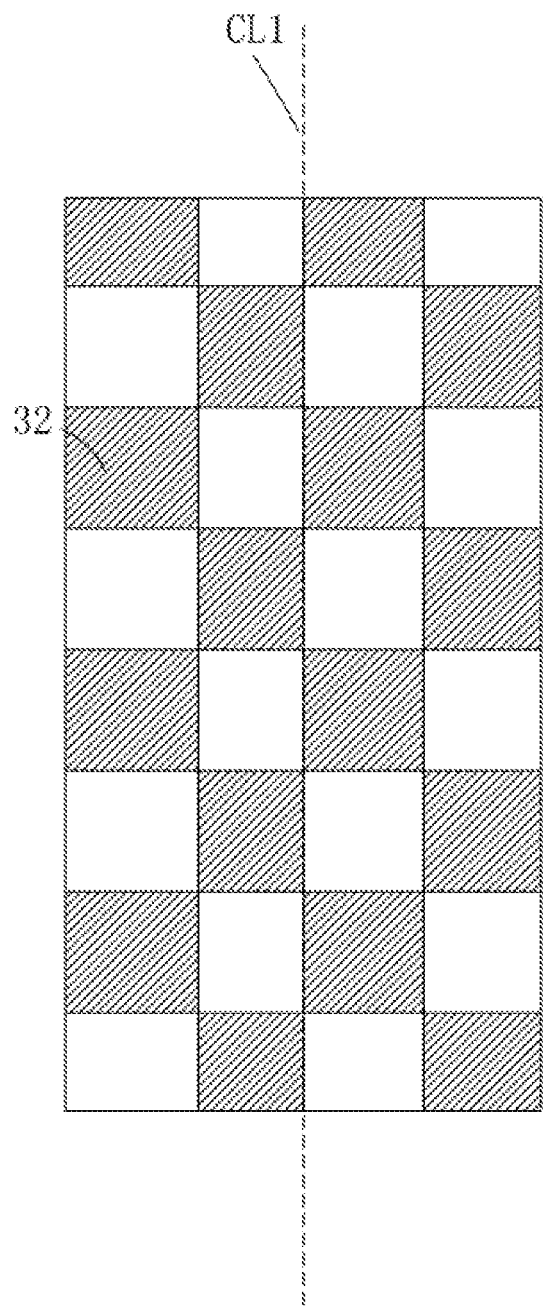
FIG. 4 is a schematic position diagram of a metal light-shielding portion and a first cutting line in a method of manufacturing a liquid crystal display panel according to another embodiment of the present disclosure.

Specifically, as shown in FIGS. 3 and 4, the shape of the metal light-shielding portion 32 can be selected according to needs. As shown in FIG. 3, in some embodiments of the present disclosure, the metal light-shielding portion 32 can be a continuous plate-shaped metal thin-film. As shown in FIG. 4, in other embodiments of the present disclosure, the metal light-shielding portion 32 can be a mesh metal thin-film. The effect of light shielding of the plate-shaped metal thin-film is better than that of the mesh metal thin-film.

Specifically, in a preferred embodiment of the present disclosure, the counter substrate 2 is a color filter substrate. A color filter layer is further disposed on the counter substrate 2.

Further, the array substrate 1 specifically includes an underlay, a first metal layer disposed on the underlay to form a gate electrode of a thin-film transistor and a gate line, a gate insulating layer disposed on the first metal layer, a semiconductor layer disposed on the gate insulating layer, a second metal layer disposed on the gate insulating layer and on the semiconductor layer to form a source electrode and a drain electrode of the thin-film transistor and a source-electrode line, a passivating layer disposed on the second metal layer, and a pixel electrode disposed on the passivating layer. According to requirements of product, the metal light-shielding portion 32 can be located on the first metal layer or on the second metal layer. When being located on the first metal layer, the metal light-shielding portion 32 is formed with the gate electrode and the gate line at the same time through a patterning process. When being located on the second metal layer, the metal light-shielding portion 32 is formed with the source electrode, the drain electrode, and the source-electrode line at the same time through a patterning process. That is to say, the present disclosure only needs to change patterns of the first metal layer and of the second metal layer to form the metal light-shielding portion 32 without adding additional patterning processes, so that additional processes and manpower costs are not increased.

It needs to be stated that the liquid crystal display panel of the present disclosure is mainly applied in a frameless liquid crystal display device. When the liquid crystal display panel is applied and when light tends to be emitted from the second region 12 of the array substrate 1, the metal light-shielding portion 32 will reflect the light to prevent the light from being emitted because of its shielding. In addition, the metal light-shielding portion 32 extends below the black matrix 31. The metal light-shielding portion 32 effectively guarantees an effect of light shielding in cooperation with the black matrix 31. Thus, light leakage occurring on edges is prevented, and display quality is improved.

Figure 2:
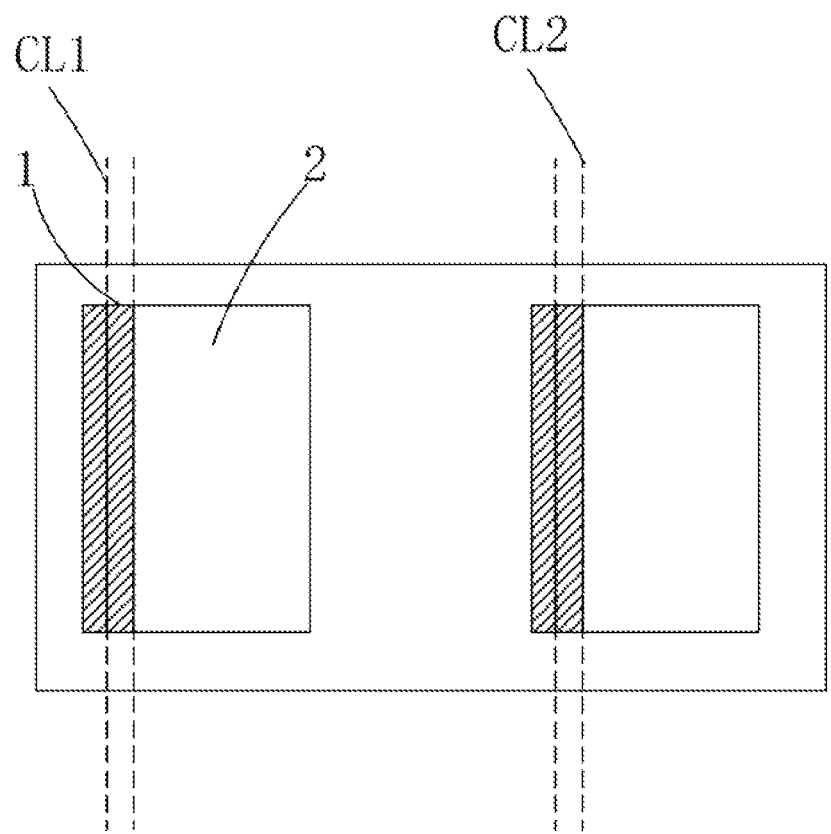
FIG. 2 is a top view of a liquid crystal display motherboard in a method of manufacturing a liquid crystal display panel according to the present disclosure.

Please refer to FIG. 5, the present disclosure further provides a method of manufacturing a liquid crystal display panel, including:

Step s1: as shown in FIGS. 2-4, a liquid crystal display motherboard is provided. The liquid crystal display motherboard includes a plurality of liquid crystal display panels arranged apart from each other.

Each of the plurality of liquid crystal display panels includes an array substrate 1, a counter substrate 2 facing the array substrate 1, and a liquid crystal layer 3 located between the array substrate 1 and the counter substrate 2. The array substrate 1 includes a first region 11 covered by the counter substrate 2, and a second region 12 located outside the first region 11. The counter substrate 2 includes a third region 21 and a fourth region 22 surrounding the third region 21.

A black matrix 31 covers one side of the fourth region 22 facing toward the array substrate 1, and a metal light-shielding portion 32 is disposed on one side of the array substrate 1 facing toward the counter substrate 2.

Step s2: a first cutting line CL1 is defined along a side-edge of the second region 12 away from the first region 11, and a second cutting line CL2 is defined along a side-edge of the fourth region 22 away from the third region 21. A side-edge of the metal light-shielding portion 32 away from the first region 11 exceeds the first cutting line CL1.

Step s3: the liquid crystal display motherboard is cut along the first cutting line and along the second cutting line for the plurality of liquid crystal display panels.

Step s4: the liquid crystal display motherboard is cut along preset first cutting lines respectively and along preset second cutting lines respectively for the plurality of liquid crystal display panels, and then a part of the metal light-shielding portion 32 exceeding the first cutting line CL1 is removed for each of the plurality of liquid crystal display panels. The rest of the metal light-shielding portion 32 covers the second region 12 and a part of the first region 11 adjacent to the second region 12, and a side-edge of the metal light-shielding portion 32 near the first region 11 is located below the black matrix 31.

Specifically, combining FIGS. 2-3 with FIG. 4, in the step s2 (i.e., before the cutting), both a distance between the side-edge of the metal light-shielding portion 32, away from the first region 11, and the first cutting line CL1 and a distance between the side-edge of the metal light-shielding portion 32, near the first region 11, and the first cutting line CL1 are greater than 100 micrometers. Such design can ensure that the metal light-shielding portion 32 can also have a shielding effect within a tolerance of a cutting process.

Specifically, an electric connection state of the metal light-shielding portion 32 can be determined according to practical requirements of product. In some embodiments of the present disclosure, the metal light-shielding portion 32 can be in a floating state without connecting with any voltage. In other embodiments of the present disclosure, the metal light-shielding portion 32 is connected to a common voltage VCom of the liquid crystal display panel. In other embodiments of the present disclosure, the metal light-shielding portion 32 can be used as external wires before cutting and can be in a floating state after cutting.

Specifically, the shape of the metal light-shielding portion 32 can be selected according to needs. As shown in FIG. 3, in some embodiments of the present disclosure, the metal light-shielding portion 32 can be a continuous plate-shaped metal thin-film. As shown in FIG. 4, in other embodiments of the present disclosure, the metal light-shielding portion 32 can be a mesh metal thin-film. The effect of light shielding of the plate-shaped metal thin-film is better than that of the mesh metal thin-film.

Specifically, in a preferred embodiment of the present disclosure, the counter substrate 2 is a color filter substrate. A color filter layer is further disposed on the counter substrate 2.

Further, the array substrate 1 specifically includes an underlay, a first metal layer disposed on the underlay to form a gate electrode of a thin-film transistor and a gate line, a gate insulating layer disposed on the first metal layer, a semiconductor layer disposed on the gate insulating layer, a second metal layer disposed on the gate insulating layer and on the semiconductor layer to form a source electrode and a drain electrode of the thin-film transistor and a source-electrode line, a passivating layer disposed on the second metal layer, and a pixel electrode disposed on the passivating layer. According to requirements of product, the metal light-shielding portion 32 can be located on the first metal layer or on the second metal layer. When being located on the first metal layer, the metal light-shielding portion 32 is formed with the gate electrode and the gate line at the same time through a patterning process. When being located on the second metal layer, the metal light-shielding portion 32 is formed with the source electrode, the drain electrode, and the source-electrode line at the same time through a patterning process. That is to say, the present disclosure only needs to change patterns of the first metal layer and of the second metal layer to form the metal light-shielding portion 32 without adding additional patterning processes, so that additional processes and manpower costs are not increased.

Figure 6:
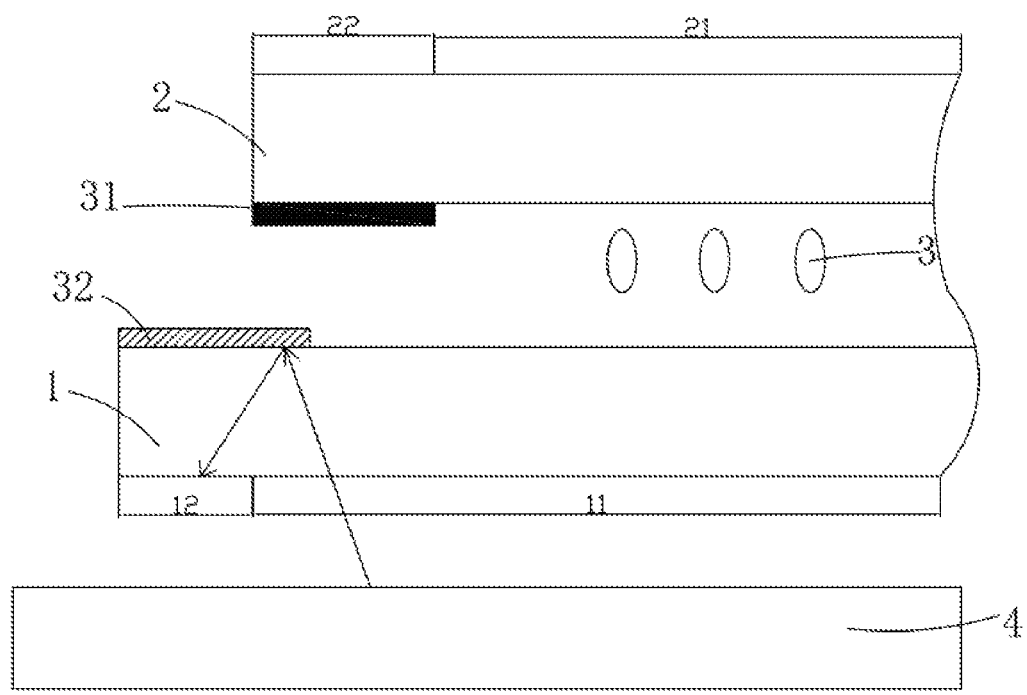
FIG. 6 is a schematic diagram of a frameless liquid crystal display device according to the present disclosure.

Combined with FIG. 6, it needs to be stated that the liquid crystal display panel of the present disclosure is mainly applied in a frameless liquid crystal display device. When the liquid crystal display panel is applied and when light tends to be emitted from the second region 12 of the array substrate 1, the metal light-shielding portion 32 will reflect the light to prevent the light from being emitted because of its shielding. In addition, the metal light-shielding portion 32 extends below the black matrix 31. The metal light-shielding portion 32 effectively guarantees an effect of light shielding in cooperation with the black matrix 31. Thus, light leakage occurring on edges is prevented, and display quality is improved.

Please refer to FIG. 6, which is a frameless liquid crystal display device including the above liquid crystal display panel.

Further, as shown in FIG. 6, the frameless liquid crystal display device includes a backlit module 4 disposed on one side of the array substrate 1, away from the counter substrate 2. When light of the backlit module 4 tends to be emitted from the second region 12 of the array substrate 1, the metal light-shielding portion 32 will reflect the light to prevent the light from being emitted because of its shielding. In addition, the metal light-shielding portion 32 extends below the black matrix 31. The metal light-shielding portion 32 effectively guarantees an effect of light shielding in cooperation with the black matrix 31. Thus, light leakage occurring on edges is prevented, and display quality is improved.

In conclusion, the present disclosure provides a liquid crystal display panel and a manufacturing method thereof, and a frameless liquid crystal display device. The liquid crystal display panel includes an array substrate, a counter substrate facing the array substrate, and a liquid crystal layer located between the array substrate and the counter substrate; wherein the array substrate includes a first region covered by the counter substrate, and a second region located outside the first region; wherein the counter substrate includes a third region and a fourth region surrounding the third region; wherein a black matrix covers one side of the fourth region facing toward the array substrate, and a metal light-shielding portion is disposed on one side of the array substrate facing toward the counter substrate; and wherein the metal light-shielding portion covers the second region and a part of the first region adjacent to the second region, and a side-edge of the metal light-shielding portion near the first region is located below the black matrix. Through adding the metal light-shielding portion, the present disclosure can solve the problem of light leakage occurring on edges of a frameless liquid crystal display device and improve display quality.

A person of ordinary skill in the art is able to make modifications or changes corresponding to the foregoing description based on the technical solutions and the technical ideas of the present disclosure, and all of these modifications and changes should be within the protective scope of the appended claims of the present disclosure.

What is claimed is:

1. A method of manufacturing a liquid crystal display panel, comprising:

s1) providing a liquid crystal display motherboard, the liquid crystal display motherboard comprising a plurality of liquid crystal display panels arranged apart from each other;
wherein each of the plurality of liquid crystal display panels comprises an array substrate, a counter substrate facing the array substrate, and a liquid crystal layer located between the array substrate and the counter substrate;
wherein the array substrate comprises a first region covered by the counter substrate, and a second region not covered by the counter substrate and located outside the first region;
wherein the counter substrate comprises a third region and a fourth region surrounding the third region; and
wherein a black matrix covers one side of the fourth region facing toward the array substrate, and a metal light-shielding portion is disposed on one side of the array substrate facing toward the counter substrate;
s2) defining a first cutting line along a side-edge of the second region away from the first region, and defining a second cutting line along a side-edge of the fourth region away from the third region, wherein a side-edge of the metal light-shielding portion away from the first region exceeds the first cutting line;
s3) cutting the liquid crystal display motherboard along the first cutting line and along the second cutting line for the plurality of liquid crystal display panels; and
s4) cutting the liquid crystal display motherboard along preset first cutting lines respectively and along preset second cutting lines respectively for the plurality of liquid crystal display panels, and then removing a part of the metal light-shielding portion exceeding the first cutting line for each of the plurality of liquid crystal display panels, wherein the rest of the metal light-shielding portion covers the second region and a part of the first region adjacent to the second region, and a side-edge of the metal light-shielding portion near the first region is located below the black matrix.

2. The method of claim 1, wherein in the step s2), both a distance between the side-edge of the metal light-shielding portion, away from the first region, and the first cutting line and a distance between the side-edge of the metal light-shielding portion, near the first region, and the first cutting line are greater than 100 micrometers.

3. The method of claim 1, wherein the metal light-shielding portion is in a floating state.

4. The method of claim 1, wherein the metal light-shielding portion is connected to a common voltage of the liquid crystal display panels.

5. The method of claim 1, wherein the metal light-shielding portion is a continuous plate-shaped metal thin-film or a mesh metal thin-film.

* * * * *